UNITED STATES PATENT OFFICE.

GIUSEPPE FRATARCANGELI AND PIETRO FRATARCANGELI, OF FROSINONE, ITALY.

PROCESS OF THE HARDENING OR MUMMIFICATION OF HUMAN AND ANIMAL BODIES AND THEIR ORGANS.

1,088,977. Specification of Letters Patent. Patented Mar. 3, 1914.

No Drawing. Application filed November 12, 1912. Serial No. 730,929.

*To all whom it may concern:*

Be it known that we, GIUSEPPE FRATARCANGELI and PIETRO FRATARCANGELI, subjects of King of Italy, residing at Boville ernica, Frosinone, Roma, Italy, have invented new and useful Improvements in Processes of Hardening or Mummification of Human and Animal Bodies and Their Organs, of which the following is a specification.

This invention is concerned with the hardening or the mummification of all organic bodies, in particular human and animal, and with their organs.

By this process all putrid substances contained in the bodies are removed; that is to say, water, undigested aliments, excrements and urine; after which the bodies are carefully washed in running water. Then the bodies are put into a glass tub filled with turpentine, care being taken to prevent the bodies from touching the sides of the said receptacle and to see to the complete covering of the bodies by the liquid. The bodies are left in this bath during a period of 10 to 15 days. In order to prevent any action of the air on the contents, the receptacle is hermetically closed.

After the above preliminary bath, the bodies are put into pure alcohol (95°) in which pure Norwegian liquid tar has been dissolved (65 grams to each liter of alcohol). This second bath is left to take effect during 15 days; taking the same precautions as for the first bath, *i. e.* prevention from touching the sides of the receptacle and keeping the bodies completely covered with liquid, the object of this long immersion is to permit the bodies to be completely soaked in the liquid in which they are placed.

After the extraction of the bodies from the last bath, and after having carefully washed them in turpentine, they are put in the shade for 3 days, after which, they are put in the sun, or subjected to some other method of drying.

If the above process has been carefully followed the hardening or mummification of the bodies will take place, by degrees, without any other treatment in a short time, which may vary between 15 days or a few months according to the quantity of flesh, and in relation to the drying action, more or less rapid.

We claim—

The herein described process of hardening or mummification of bodies which consists in removing all putrid substances from the body, immersing the body in turpentine, then immersing the body in alcohol containing pine tar in solution, then washing the body with turpentine, and finally drying the body.

In testimony whereof we have signed our names to this specification in the presence of two subscribing witnesses.

GIUSEPPE FRATARCANGELI. [L. S.]
    PIETRO FRATARCANGELI. [L. S.]

Witnesses:
    ERNEST MANNING,
    CHARLES L. BOLOQUEZ.

Copies of this patent may be obtained for five cents each, by addressing the "Commissioner of Patents Washington, D. C."